(12) United States Patent
Calta et al.

(10) Patent No.: US 11,338,390 B2
(45) Date of Patent: May 24, 2022

(54) TWO-COLOR HIGH SPEED THERMAL IMAGING SYSTEM FOR LASER-BASED ADDITIVE MANUFACTURING PROCESS MONITORING

(71) Applicant: LAWRENCE LIVERMORE NATIONAL SECURITY, LLC, Livermore, CA (US)

(72) Inventors: Nicholas P. Calta, San Jose, CA (US); Gabe Guss, Manteca, CA (US); Manyalibo Joseph Matthews, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 531 days.

(21) Appl. No.: 16/273,953

(22) Filed: Feb. 12, 2019

(65) Prior Publication Data

US 2020/0254565 A1 Aug. 13, 2020

(51) Int. Cl.
*B23K 26/342* (2014.01)
*B33Y 10/00* (2015.01)
(Continued)

(52) U.S. Cl.
CPC .......... *B23K 26/342* (2015.10); *B23K 26/032* (2013.01); *B23K 26/034* (2013.01);
(Continued)

(58) Field of Classification Search
CPC ...... G01B 11/27; G01B 11/272; G01J 1/0266; G01J 1/0411; G01J 1/4228; G01J 3/0208; G01J 3/0237; G01J 3/0286; G01J 3/0289; G01J 5/0806; G01J 5/089; G01J 5/004; G01J 5/06; G01J 5/0831; G01J 5/00; G01J 5/60; G02B 27/34; G02B 27/36; G02B 7/287; H04N 17/002; H04N 5/23212; H04N 5/232123; H04N 5/2258; B23K 26/34; B23K 26/702; B23K 31/125; B23K 26/06; B23K 26/03; B23K 26/032; B23K 26/034;
(Continued)

(56) References Cited

U.S. PATENT DOCUMENTS 6,995,334 B1 2/2006 Kovacevic et al.
2005/0002438 A1* 1/2005 Hashimoto et al. ...... G01J 5/00
(Continued)

OTHER PUBLICATIONS

Ota et al., Mote-Carlo Modelling to Determine Optimum Filter Choices for Sub-Microsecond Optical Pyrometry, Apr. 4, 2017, Review of Scientific Instruments, 88, p. 1-3 (Year: 2017).*
(Continued)

*Primary Examiner* — Joel M Attey
*Assistant Examiner* — Rachel R Rizzo
(74) *Attorney, Agent, or Firm* — Eddie E. Scott (57) ABSTRACT

Monitoring melt pool temperature in laser powder bed fusion by providing a build laser that produces a laser beam that is directed onto the melt pool and produces an incandescence that emanates from the melt pool, receiving the incandescence and producing a first image having a first spectral band and a second image having a second spectral band, and determining the ratio of said first image having a first spectral band and said second image having a second spectral band to monitor the melt pool temperature.

21 Claims, 5 Drawing Sheets

(51) Int. Cl.
  *B33Y 30/00* (2015.01)
  *B23K 26/70* (2014.01)
  *B33Y 50/00* (2015.01)
  *B23K 26/03* (2006.01)
  *B33Y 40/00* (2020.01)
  *G06T 5/20* (2006.01)
  *G06T 7/00* (2017.01)
  *G06T 7/70* (2017.01)

(52) U.S. Cl.
  CPC ............ *B23K 26/702* (2015.10); *B33Y 10/00* (2014.12); *B33Y 30/00* (2014.12); *B33Y 40/00* (2014.12); *B33Y 50/00* (2014.12); *G06T 5/20* (2013.01); *G06T 7/0016* (2013.01); *G06T 7/70* (2017.01)

(58) Field of Classification Search
  CPC ........ B23K 26/342; G06T 2207/30164; G06T 7/0016; G06T 7/70; G06T 5/20; B22F 12/00; B33Y 10/00; B33Y 30/00; B33Y 50/02; B33Y 40/00; G05B 2219/36199; G05B 2219/45041; Y02P 10/25; G01N 21/00
  See application file for complete search history.

(56) References Cited

U.S. PATENT DOCUMENTS

| | | |
|---|---|---|
| 2015/0316496 A1 | 11/2015 | Chang et al. |
| 2016/0114431 A1* | 4/2016 | Cheverton et al. .... B23K 26/06 |
| 2016/0305774 A1 | 10/2016 | Ross, Jr. et al. |
| 2017/0014953 A1 | 1/2017 | Uchida et al. |

OTHER PUBLICATIONS

International Search Report and Written Opinion for PCT/US2020/017500 corresponding to U.S. Appl. No. 16/273,953, 9 pages.

\* cited by examiner

TWO-COLOR HIGH SPEED THERMAL IMAGING SYSTEM FOR LASER-BASED ADDITIVE MANUFACTURING PROCESS MONITORING

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to additive manufacturing and more particularly to a two-color high speed thermal imaging system for laser-based additive manufacturing process monitoring.

State of Technology

This section provides background information related to the present disclosure which is not necessarily prior art.

Laser Powder Bed Fusion (L-PBF) is a common additive manufacturing technology used to produce metal parts with complex geometries. In L-PBF, a laser scans over a thin bed of metal powder, selectively melting and consolidating the areas where solid metal is desired for the part while leaving the remainder of the bed unmelted. This process is repeated layer by layer to build a three-dimensional part as a series of two-dimensional slices. While L-PBF has great potential to enable manufacturing of a wider range of part designs, current L-PBF-made parts require extensive testing for qualification prior to end use.

One notable need for L-PBF that can help address the substantial challenges associated with part qualification is improved process monitoring and control, particularly focused on the region where the laser interacts with the powder bed to melt material, known as the melt pool. Furthermore, such process monitoring must be sufficiently fast to resolve the dynamics of L-PBF processes, typically ~10 kHz, with sufficient spatial resolution to provide meaningful information about a melt pool that is ~150 μm in diameter.

Temperature dynamics in and around the melt pool have a strong influence on both the bulk properties of the part and the formation of local defects, which are unacceptable for most parts produced by L-PBF. The most straightforward approach to process monitoring of the melt pool uses either a high speed optical camera, single wavelength thermal camera, photodiode, or spectrometer. While examples of these solutions are currently available, each approach has drawbacks. Optical imaging does not contain any temperature information, and while single wavelength thermal cameras provide spatially resolved temperature information their accuracy is limited by how well the melt pool emissivity is estimated and the amount of spatter interfering with the measurement. Photodiodes provide a reasonably accurate measurement of relative temperature and can sample quickly; but, provide no spatial information and therefore cannot quantify cooling rate or thermal gradient. Spectrometers are capable of fast sampling and can deconvolute emissivity, thermal emission, and plasma emission from a vapor plume, but like photodiodes they cannot provide spatial information.

U.S. Pat. No. 6,995,334 for a system and method for controlling the size of the molten pool in laser-based additive manufacturing provides the state of technology information reproduced below.

"In laser-based additive manufacturing ("LBAM"), a laser beam creates a weld pool into which powder is injected and melted. The substrate is scanned by the laser/powder system in order to trace a cross-section. Upon solidification, the trace forms a cross-section of a part. Consecutive layers are then additively deposited, thereby producing a three-dimensional component."

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventors have developed apparatus, systems, and methods that provide a new approach for process monitoring. The inventors' apparatus, systems, and methods provide high speed, high resolution thermal imaging of the melt pool. In various embodiments the inventors' apparatus, systems, and methods provide two-color thermal imaging to monitor the melt pool in laser powder bed fusion (L-PBF) with sufficiently high temporal and spatial resolution to resolve process dynamics. The inventors' apparatus, systems, and methods are relatively insensitive to common experimental conditions that confound most thermographic measurements such as emissivity variation and interference from spatter and metal vapor.

In various embodiments the inventors' apparatus, systems, and methods provide two color thermal imaging to monitoring melt pool temperature. This approach monitors two different wavelengths and uses the ratio between the two to determine temperature. This approach avoids many of the complications of traditional single-wavelength thermal imaging because uncertainties introduced by changing emissivity or spatter obscuring the melt pool are avoided. While two-wavelength thermal cameras are commercially available, they are not capable of sampling fast enough to fully resolve melt pool dynamics.

The inventors' apparatus, systems, and methods provide high speed, high resolution, melt pool temperature monitoring that includes spatial information. The inventors' apparatus, systems, and methods provide a two-color thermal imaging scheme capable of 20 kHz sampling with tens of micron resolution.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Figure 1:
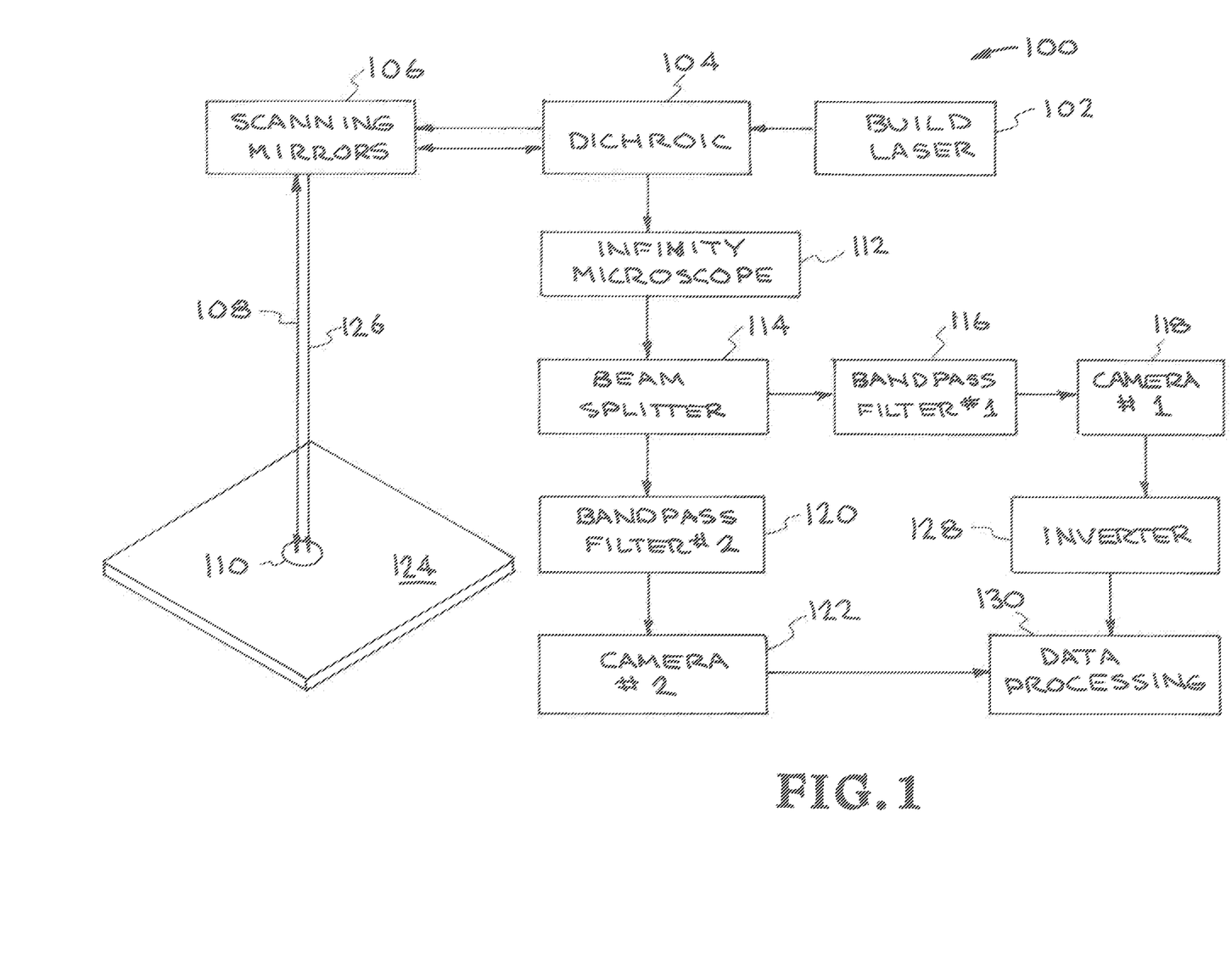
FIG. 1 is a simplified schematic depiction that illustrates a first embodiment of the inventor's apparatus, systems, and methods.

Referring now to the drawing and in particular to FIG. 1, a simplified schematic depiction illustrates a first embodiment of the inventor's apparatus, systems, and methods. This first embodiment is designated generally by the reference numeral 100. As illustrated, the embodiment 100 includes a number of components. The components of the inventor's apparatus, systems, and methods 100 illustrated in FIG. 1 are identified and described below. FIG. 1 is a schematic of the optical path.

Reference Numeral 102—Build laser,
Reference Numeral 104—Dichroic,
Reference Numeral 106—scanning mirrors,
Reference Numeral 108—Incandescence,
Reference Numeral 110—Melt pool,
Reference Numeral 112—Telescope (Infinity Microscope),
Reference Numeral 114—Beam splitter,
Reference Numeral 116—Bandpass filter #1,
Reference Numeral 118—Camera #1,
Reference Numeral 120—Bandpass filter #2,
Reference Numeral 122—Camera #2,
Reference Numeral 124—Build Plate (Powder Bed),
Reference Numeral 126—Laser beam,
Reference Numeral 128—Inverter, and
Reference Numeral 130—Data processing.

The identification and description of the first embodiment 100 components illustrated in FIG. 1 having been completed, the operation and additional description of the inventor's first embodiment 100 will now be considered in greater detail. The two-color high speed thermal imaging system directly images light emitted from the melt pool 110 descanned through the laser scanning optics so that the melt pool 110 is always at the center of the field of view, regardless of location on the build plate 124. This allows for fast sampling focused only on the small region of interest around the melt pool 110.

The build laser 102 produces a laser beam 126 that is directed onto the build plate powder bed 124. The light 108 is emitted from the melt pool 110, reflected back along the laser path by the scanner mirrors 106, and then reflected by a long pass dichroic 104 which allows the ~1 um laser light to pass to the build plate while reflecting the shorter wavelength thermal emissions at a 45° angle into an infinity microscope 112. From the microscope 112 the image is split by a broadband 50/50 beam splitter 114. Each image copy then passes through a narrow bandpass filter 116, 120 to select the spectral region of interest, which can be varied based on the material or temperature range being monitored, and then is collected by two machine vision CMOS cameras 118, 122. The cameras are triggered by the scanning laser and are capable of data collection rates exceeding 20 kHz. The image collected by camera #2 is then flipped by an inverter 128, and data from both cameras are then transferred to the data processing unit 130.

The setup produces greyscale images of light intensity for two wavelength bands $\lambda 1$-$\lambda 2$ and $\lambda 3$-$\lambda 4$. The two thermal images are then divided on a pixel by pixel basis to produce an image consisting of a spatial map of the ratio between the collected light intensity of the two chosen spectral bands. This ratio relates to temperature according to equation 1:

$$R(T) = \frac{\int_{\lambda_1}^{\lambda_2} \frac{2hc^2}{\lambda^5} \left(e^{\frac{hc}{\lambda k_B T}} - 1\right)^{-1} d\lambda}{\int_{\lambda_3}^{\lambda_4} \frac{2hc^2}{\lambda^5} \left(e^{\frac{hc}{\lambda k_B T}} - 1\right)^{-1} d\lambda} \quad \text{[Equation 1]}$$

Equation 1 is restated below in a more readable format:

$$R(T) = \left(\int_{\lambda_1}^{\lambda_2} E d\lambda\right) \bigg/ \left(\int_{\lambda_3}^{\lambda_4} E d\lambda\right)$$

where $E = \frac{2hc^2}{\lambda^5}(e^a - 1)^{-1}$ and $a = \frac{hc}{\lambda k_B T}$ and the ratio as a function of temperature is calculated by dividing the integral of the thermal emission between wavelengths 1 and 2 by the integral of the thermal emission between wavelengths 3 and 4. The thermal emission is two times the Planck constant times the speed of light squared divided by wavelength to the fifth power. This quantity is multiplied by negative one plus e to the power of the speed of light times the planck constant divided by wavelength times the Boltzmann constant times the temperature.

Where R is the ratio of intensities between the two spectral bands, T is temperature, h is the Planck constant, c is the speed of light, kB represents Boltzmann's constant, and $\lambda$ represents wavelength, with the two spectral regions of interest as defined by the two bandpass filters encompassing λ1-λ2 and λ3-λ4. Losses in the optical path change the absolute value but not the shape of the ratio vs true temperature curve, permitting straightforward calibration with standard black body sources of known temp.

A calibration curve is used that is fit to experimentally collected data generated by heating objects placed on the build plate to a known temperature and measuring their two color ratio. These ratios, which correspond to unique temperature values, are then fit to an empirical relationship which is used to determine temperature.

The Inventors used 780-820 nm and 830-870 nm as the colors. The best 2 colors depend on a variety of factors such as the characteristics of the scanning mirrors, the material being manufactured, and the sensitivity of the cameras used as detectors. In general colors between ~650 nm and ~950 run should work, based on the temperatures of Interest and the current state of high speed camera technology.

Figure 2:
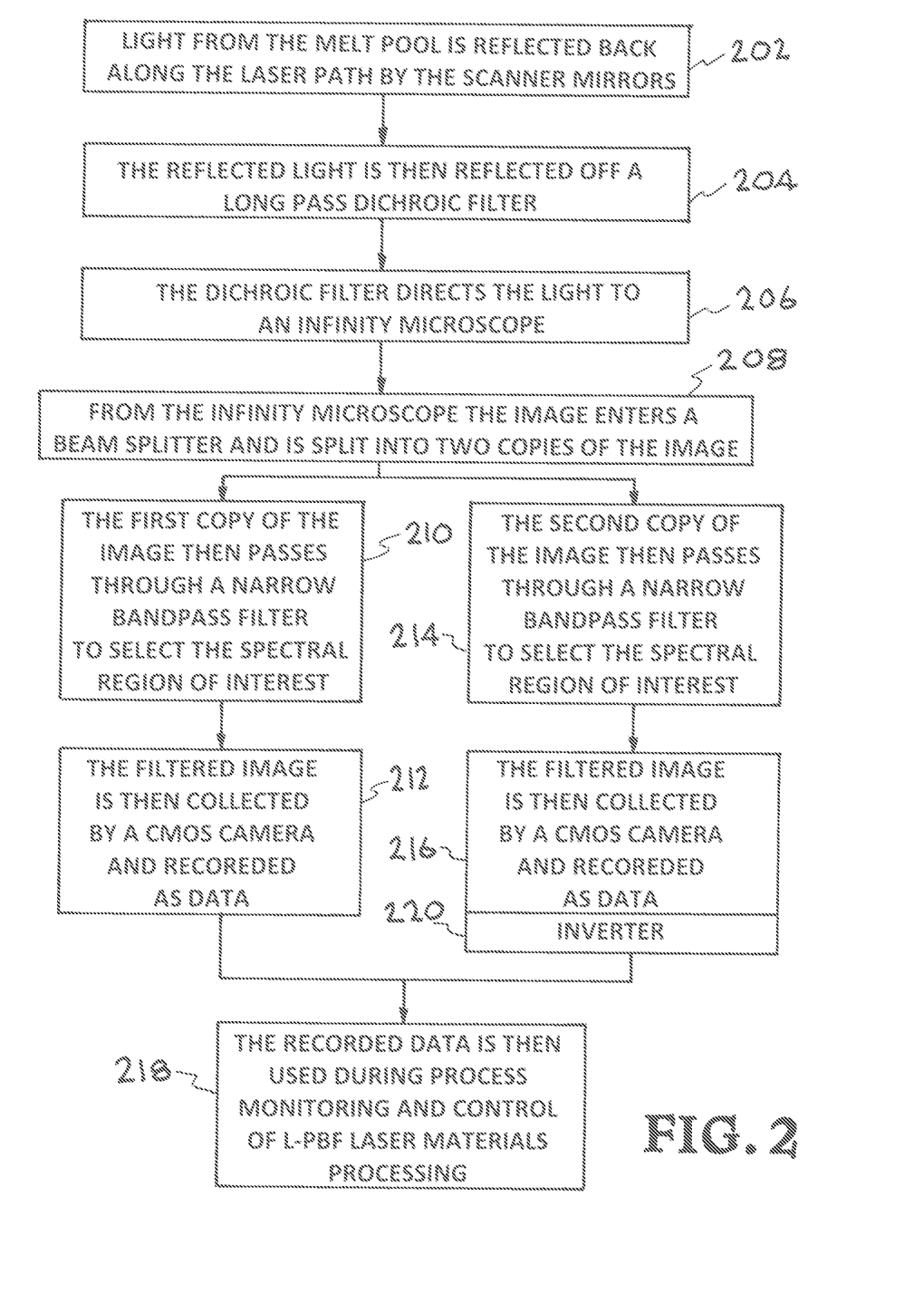
FIG. 2 is a flow chart that further illustrates the first embodiment of the inventor's apparatus, systems, and methods.

Referring now to FIG. 2, a flow chart further illustrate the first embodiment 100 of the inventor's apparatus, systems, and methods introduced in FIG. 1. The flow chart includes a number of steps. The steps of the inventor's apparatus, systems, and methods 100 illustrated in FIG. 2 are identified and described below. The FIG. 2 flow chart and the FIG. 1 drawing further illustrates and provides additional details of the first embodiment 100 of the inventor's apparatus, systems, and methods.

Reference Numeral 202—Light from the melt pool 110 is reflected back along the laser path 108 by the scanner mirrors 106, Reference Numeral 204—The reflected light is then passed through a long pass dichroic filter 104, Reference Numeral 206—The dichroic filter 104 directs the light to an infinity microscope 112, Reference Numeral 208—From the infinity microscope 112 the image enters a beam splitter 114 and is split into two copies of the image, Reference Numeral 210—The first copy of image then passes through a narrow bandpass filter 116 to select the spectral region of interest, Reference Numeral 212—The filtered image is then collected by a CMOS camera 118 and recorded as data, Reference Numeral 214—The second copy of image then passes through a narrow bandpass filter 120 to select the spectral region of interest, Reference Numeral 216—The filtered image is then collected by a CMOS camera 118 and recorded as data, Reference Numeral 218—The recorded data is then used during process monitoring of laser materials during Laser Powder Bed Fusion (L-PBF) processing, and Reference Numeral 220—The inverter 128/220 is located between 118 camera #2 and data processing unit 130.

Figure 3:
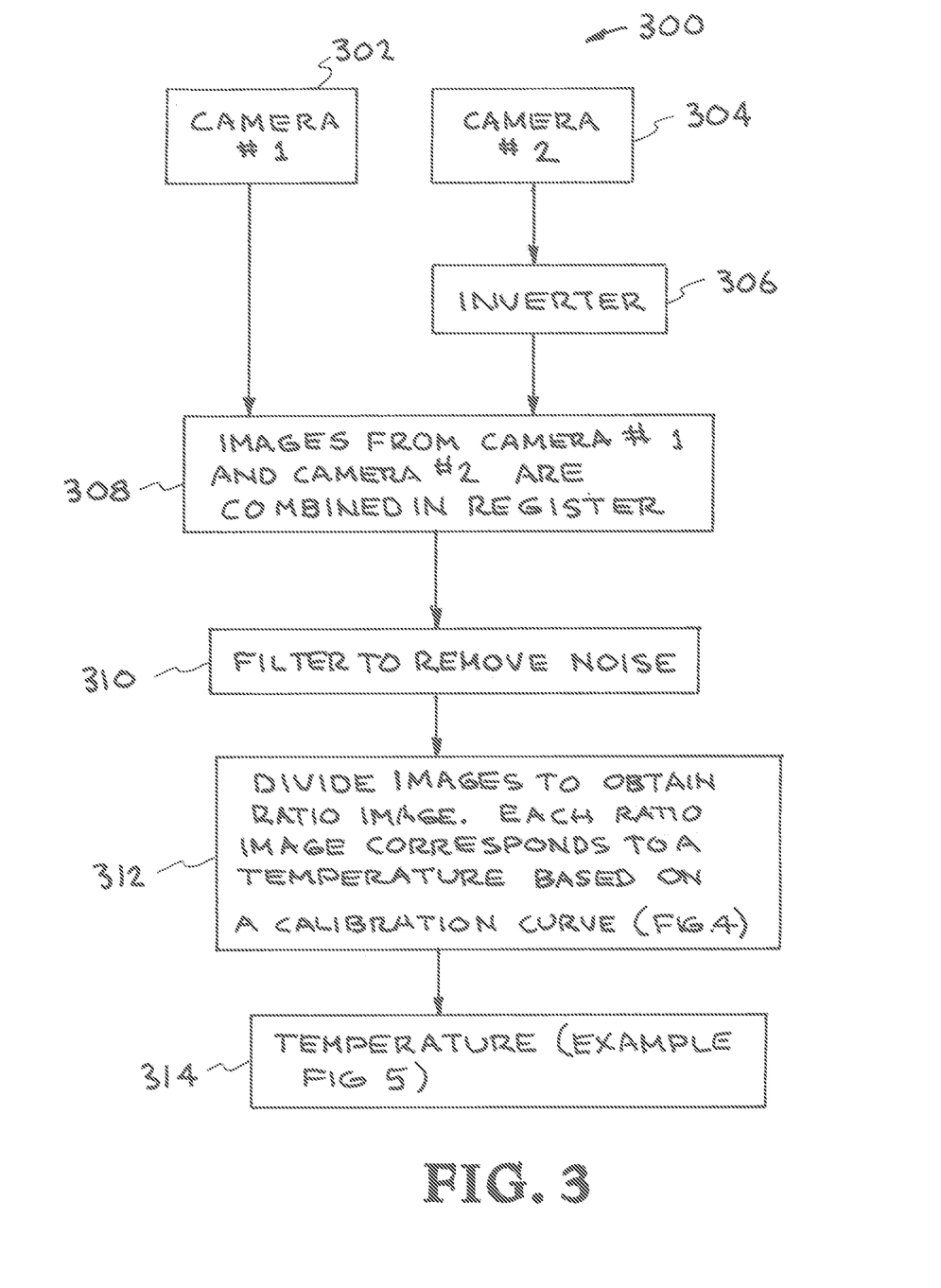
FIG. 3 is a flow chart illustrating a data processing scheme used in various embodiments of the inventor's apparatus, systems, and methods.

Referring now to FIG. 3, a flow chart provides additional information about the inventor's data processing scheme used in various embodiments of the inventor's apparatus, systems, and methods. The flow chart includes a number of structural components and steps. The components and steps illustrated in FIG. 3 are collectively identified by the reference numeral 300 and are identified and described below.

Figure 5:
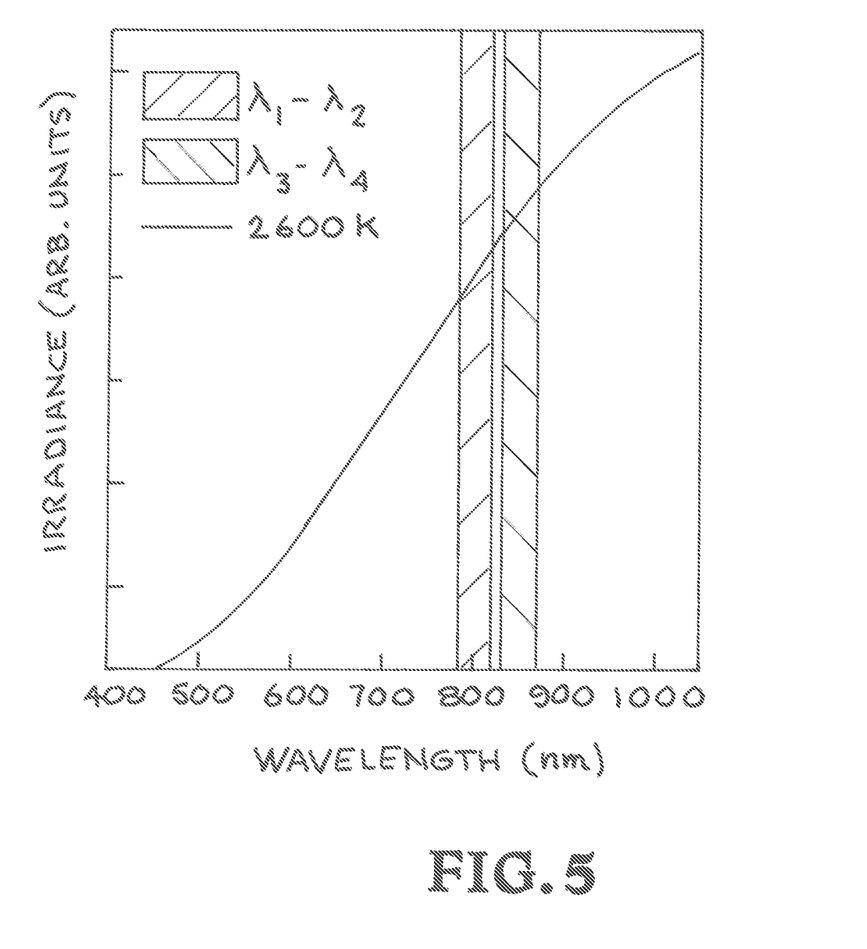
FIG. 5 is a graph illustrating an example embodiment of the inventor's apparatus, systems, and methods.

Reference Numeral 302—Camera #1,
Reference Numeral 304—Camera #2,
Reference Numeral 306—Inverter,
Reference Numeral 308—Images combined and registered,
Reference Numeral 310—Filter,
Reference Numeral 312—Images divided, and
Reference Numeral 314—Temperature monitoring (Example embodiment FIG. 5).

Raw images are collected by the two cameras 302 & 304 at different wavelengths. The camera 304 image is inverted by inverter 306 to account for image transfer by the beam splitters. The image from camera 302 and the inverted image from camera 304 are then registered spatially to one another 308. After registration 308, the images are filtered 310 to remove artifacts from noise and background counts. The images are then divided 312 to obtain a map of the ratio between the two single color images collected by the two cameras 302 & 304. The corresponds to a unique temperature value illustrated in FIG. 5.

Figure 4:
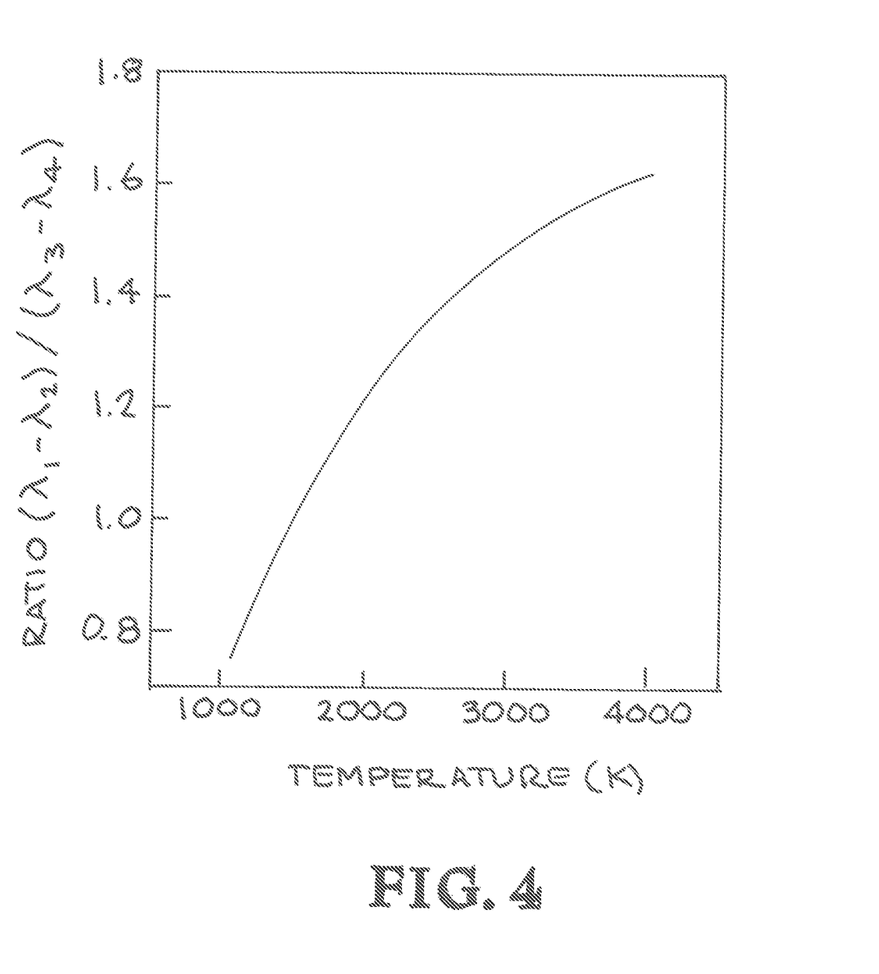
FIG. 4 is a calibration curve used in various embodiments of the inventor's apparatus, systems, and methods.

Referring now to FIG. 4, a calibration curve is shown that used in various embodiments of the inventor's apparatus, systems, and methods. The calibration curve is used to convert the ratio image to a temperature map. The setup produces greyscale images of light intensity for two wavelength bands λ1-λ2 and λ3-λ4. The two thermal images are then divided on a pixel by pixel basis to produce an image consisting of a spatial map of the ratio between the collected light intensity of the two chosen spectral bands. This ratio relates to temperature according to equation 1:

$$R(T) = \frac{\int_{\lambda_1}^{\lambda_2} \frac{2hc^2}{\lambda^5}\left(e^{\frac{hc}{\lambda k_B T}} - 1\right)^{-1} d\lambda}{\int_{\lambda_3}^{\lambda_4} \frac{2hc^2}{\lambda^5}\left(e^{\frac{hc}{\lambda k_B T}} - 1\right)^{-1} d\lambda} \quad \text{[Equation 1]}$$

Equation 1 is restated below in a more readable format:

$$R(T) = \left(\int_{\lambda_1}^{\lambda_2} E d\lambda\right) \bigg/ \left(\int_{\lambda_3}^{\lambda_4} E d\lambda\right)$$

$$\text{where } E = \frac{2hc^2}{\lambda^5}(e^a - 1)^{-1} \text{ and } a = \frac{hc}{\lambda k_B T}$$

and the ratio as a function of temperature is calculated by dividing the integral of the thermal emission between wavelengths 1 and 2 by the integral of the thermal emission between wavelengths 3 and 4. The thermal emission is two times the Planck constant times the speed of light squared divided by wavelength to the fifth power. This quantity is multiplied by negative one plus e to the power of the speed of light times the planck constant divided by wavelength times the Boltzmann constant times the temperature.

Where R is the ratio of intensities between the two spectral bands, T is temperature, h is the Planck constant, c is the speed of light, kB represents Boltzmann's constant, and λ represents wavelength, with the two spectral regions of interest as defined by the two bandpass filters encompassing λ1-λ2 and λ3-λ4. Losses in the optical path change the absolute value but not the shape of the ratio vs true temperature curve, permitting straightforward calibration with standard black body sources of known temperature.

Referring now to FIG. 5, a graph illustrates an example embodiment of the inventor's apparatus, systems, and methods. FIG. 5 illustrates the black body spectrum emitted from a material at 2600 K (black curve) and the two wavelength bands λ1-λ2 and λ3-λ4 measured by the two cameras. Each value measured by the first camera is divided by the value measured by the second camera, which produces a ratio. That ratio corresponds to a value on the calibration curve FIG. 4. That calibration curve is determined based on measurements of temperature standards.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An apparatus for monitoring melt pool temperature in laser powder bed fusion, comprising:
   a build laser,
   a laser beam produced by said build laser wherein said laser beam is directed onto the melt pool producing a light beam that emanates from the melt pool,
   a beamsplitter,
   a microscope that receives said light beam and directs said light beam into said beam splitter where said beam is split into a first light beam image and a second light beam image,
   a first camera that receives said first light beam image and produces
   a first image having a first spectral band,
   a second camera that receives said second light beam image and produces a second image having a second spectral band, and
   a processor that determines the ratio of said first image having a first spectral band and said second image having a second spectral band for monitoring the melt pool temperature.

2. The apparatus of claim 1
   wherein said first camera and said second camera each have a center of field of view and wherein said first camera and second camera are positioned wherein the melt pool is always in said center of field of view of said first camera and said second camera.

3. The apparatus of claim 1
   wherein said first camera receives said first light beam image and produces a first image having a first spectral band on a pixel by pixel basis,
   wherein said second camera receives said second light beam image and produces a second image having a second spectral band on a pixel by pixel basis, and
   wherein said processor is a processor that provides a spatial map of the ratio of
   said first image having a first spectral band on a pixel by pixel basis and
   said second image having a second spectral band on a pixel by pixel basis.

4. The apparatus of claim 1
   wherein said processor is a processor that fits said first spectral band and said second image having a second spectral band into an empirical relationship to monitor the melt pool temperature.

5. The apparatus of claim 4
   wherein said empirical relationship corresponds to the equation $$R(T) = \left(\int_{\lambda_1}^{\lambda_2} E\, d\lambda\right) \Big/ \left(\int_{\lambda_3}^{\lambda_4} E\, d\lambda\right)$$

$$\text{where } E = \frac{2hc^2}{\lambda^5}(e^a - 1)^{-1} \text{ and } a = \frac{hc}{\lambda k_B T}$$

and the ratio as a function of temperature is calculated by dividing the integral of the thermal emission between wavelengths 1 and 2 by the integral of the thermal emission between wavelengths 3 and 4, the thermal emission is two times the Planck constant times the speed of light squared divided by wavelength to the fifth power, and this quantity is multiplied by negative one plus e to the power of the speed of light times the planck constant divided by wavelength times the Boltzmann constant times the temperature, where R is the ratio of intensities between said first spectral band and said second spectral band, T is temperature, h is the Planck constant, c is the speed of light, kB represents Boltzmann's constant, and λ represents wavelength, with said first spectral band and said second spectral band regions of interest as defined by the two bandpass filters encompassing λ1-λ2 and λ3-λ4.

6. An apparatus for monitoring laser powder bed fusion that includes a melt pool on a build plate, comprising:
a build laser,
a laser beam produced by said build laser wherein said laser beam is directed onto the build plate producing the melt pool and wherein a light beam emanates from the melt pool,
scanning mirrors that receive said light beam from the light pool,
an infinity microscope,
a dichroic that receives said light beam from said scanning mirrors and directs said light beam to said infinity microscope,
a beam splitter that receives said light beam from said infinity microscope and produces a first beam and a second beam,
a first bandpass filter that receives said first beam and produces a first image,
a second bandpass filter that receives said second beam and produces a second image,
a first camera that receives said first image and records first data,
a second camera that receives said second image and records second data, and
a processor that determines the ratio of said first data and said second data for monitoring the melt pool temperature.

7. The apparatus of claim 6
wherein said first camera and said second camera each have a center of field of view and wherein said first camera and second camera are positioned wherein the melt pool is always in said center of field of view of said first camera and said second camera.

8. The apparatus of claim 6
wherein said first bandpass filter provides a first image having a first spectral band,
wherein said second bandpass filter provides a second image having a second spectral band, and
wherein said processor determines the ratio of said first spectral band and said second spectral band for monitoring the melt pool temperature.

9. The apparatus of claim 8
wherein said processor is a processor that fits said first spectral band and said second image having a second spectral band into an empirical relationship to monitor the melt pool temperature.

10. The apparatus of claim 9
wherein said empirical relationship corresponds to the equation $$R(T) = \left(\int_{\lambda_1}^{\lambda_2} E d\lambda\right) / \left(\int_{\lambda_3}^{\lambda_4} E d\lambda\right)$$

where $E = \frac{2hc^2}{\lambda^5}(e^a - 1)^{-1}$ and $a = \frac{hc}{\lambda k_B T}$ the ratio as a function of temperature is calculated by dividing the integral of the thermal emission between wavelengths 1 and 2 by the integral of the thermal emission between wavelengths 3 and 4, the thermal emission is two times the Planck constant times the speed of light squared divided by wavelength to the fifth power, and this quantity is multiplied by negative one plus e to the power of the speed of light times the planck constant divided by wavelength times the Boltzmann constant times the temperature, where R is the ratio of intensities between said first spectral band and said second spectral band, T is temperature, h is the Planck constant, c is the speed of light, kB represents Boltzmann's constant, and λ represents wavelength, with said first spectral band and said second spectral band regions of interest as defined by the two bandpass filters encompassing λ1-λ2 and λ3-λ4.

11. A method of monitoring melt pool temperature in laser powder bed fusion, comprising the steps of:
providing a build laser that produces
a laser beam that is directed onto the melt pool and produces a light beam that emanates from the melt pool,
providing a microscope that receives said light beam,
providing a beamsplitter that receives said light beam from said microscope and produces
a first image having a first spectral band and
a second image having a second spectral band,
and
determining the ratio of said first image having a first spectral band and said second image having a second spectral band to monitor the melt pool temperature.

12. The method of claim 11
wherein said first image having a first spectral band is produced by a camera having a first center of field of view,
wherein said second image having a second spectral band is produced by a camera having a second center of field of view,
wherein said first camera is positioned with the melt pool in said first center of field of view, and
wherein said second camera is positioned with the melt pool in said second center of field of view,
wherein said first camera and said second camera each have a center of field of view and wherein said first camera and second camera are positioned wherein the melt pool is always in said center of field of view of said first camera and said second camera.

13. The method of claim 11
wherein said step of producing first image having a first spectral band and producing said second image having a second spectral band comprises
producing first image having a first spectral band on a pixel by pixel basis and
producing said second image having a second spectral band on a pixel by pixel basis, and
wherein said step of determining the ratio comprises
providing a spatial map of the ratio of
said first image having a first spectral band on a pixel by pixel basis and
said second image having a second spectral band on a pixel by pixel basis.

14. The method of claim 11
wherein said step of determining the ratio of said first image having a first spectral band and said second image having a second spectral band comprises fitting said first spectral band and said second image having a second spectral band into an empirical relationship to monitor the melt pool temperature.

15. The method of claim 14
wherein said empirical relationship corresponds to the equation $$R(T) = \left(\int_{\lambda_1}^{\lambda_2} E d\lambda\right) \Big/ \left(\int_{\lambda_3}^{\lambda_4} E d\lambda\right)$$

where $E = \frac{2hc^2}{\lambda^5}(e^a - 1)^{-1}$ and $a = \frac{hc}{\lambda k_B T}$ the ratio as a function of temperature is calculated by dividing the integral of the thermal emission between wavelengths 1 and 2 by the integral of the thermal emission between wavelengths 3 and 4, the thermal emission is two times the Planck constant times the speed of light squared divided by wavelength to the fifth power, and this quantity is multiplied by negative one plus e to the power of the speed of light times the planck constant divided by wavelength times the Boltzmann constant times the temperature, where R is the ratio of intensities between said first spectral band and said second spectral band, T is temperature, h is the Planck constant, c is the speed of light, kB represents Boltzmann's constant, and λ represents wavelength, with said first spectral band and said second spectral band regions of interest as defined by the two bandpass filters encompassing λ1-λ2 and λ3-λ4.

16. A method of monitoring laser powder bed fusion that includes a melt pool on a build plate, comprising the steps of:
providing a build laser that produces
a laser beam that is directed onto the build plate producing the melt pool and a light beam that emanates from the melt pool,
receiving said light beam from the melt pool with scanning mirrors and directing said light beam to
a dichroic that receives said light beam from said scanning mirrors and directs said light beam to an infinity microscope, wherein said light beam is directed to
a beam splitter that receives said light beam from said infinity microscope and produces a first beam and a second beam,
directing said first beam to a first bandpass filter to produce a first image,
directing said second beam to a second bandpass filter to produce a second image,
using a first camera to receive said first image wherein said first camera records first data,
using a second camera to receive said second image wherein said second camera records second data, and
determining the ratio of said first data and said second data to monitor the melt pool temperature.

17. The method of claim 16
wherein said first image having a first spectral band is produced by a camera having a first camera center of field of view,
wherein said second image having a second spectral band is produced by a camera having a second camera center of field of view,
wherein said first camera is positioned wherein the melt pool is always in said first camera center of field of view, and
wherein said second camera is positioned wherein the melt pool is always in said second camera center of field of view.

18. The method of claim 16
wherein said first bandpass filter produces a first image having a first spectral band,
wherein said second bandpass filter produces a second image having a spectral band, and
wherein said step of determining the ratio of said first data and said second data comprises determining the ratio of said first spectral band and said second spectral band.

19. The method of claim 18
wherein said step of producing first image having a first spectral band and producing said second image having a second spectral band comprises
producing first image having a first spectral band on a pixel by pixel basis and
producing said second image having a second spectral band on a pixel by pixel basis, and
wherein said step of determining the ratio comprises
providing a spatial map of the ratio of
said first image having a first spectral band on a pixel by pixel basis and
said second image having a second spectral band on a pixel by pixel basis.

20. The method of claim 18
wherein said step of determining the ratio of said first image having a first spectral band and said second image having a second spectral band comprises fitting said first spectral band and said second image having a second spectral band into an empirical relationship to monitor the melt pool temperature.

21. The method of claim 20
wherein said empirical relationship corresponds to the equation $$R(T) = \left(\int_{\lambda_1}^{\lambda_2} E d\lambda\right) \Big/ \left(\int_{\lambda_3}^{\lambda_4} E d\lambda\right)$$

where $E = \frac{2hc^2}{\lambda^5}(e^a - 1)^{-1}$ and $a = \frac{hc}{\lambda k_B T}$ the ratio as a function of temperature is calculated by dividing the integral of the thermal emission between wavelengths 1 and 2 by the integral of the thermal emission between wavelengths 3 and 4, the thermal emission is two times the Planck constant times the speed of light squared divided by wavelength to the fifth power, and this quantity is multiplied by negative one plus e to the power of the speed of light times the planck constant divided by wavelength times the Boltzmann constant times the temperature, where R is the ratio of intensities between said first spectral band and said second spectral band, T is temperature, h is the Planck constant, c is the speed of light, kB represents Boltzmann's constant, and λ represents wavelength, with said first spectral band and said second spectral band regions of interest as defined by two bandpass filters encompassing λ1-λ2 and λ3-λ4.

* * * * *